Figure 1:
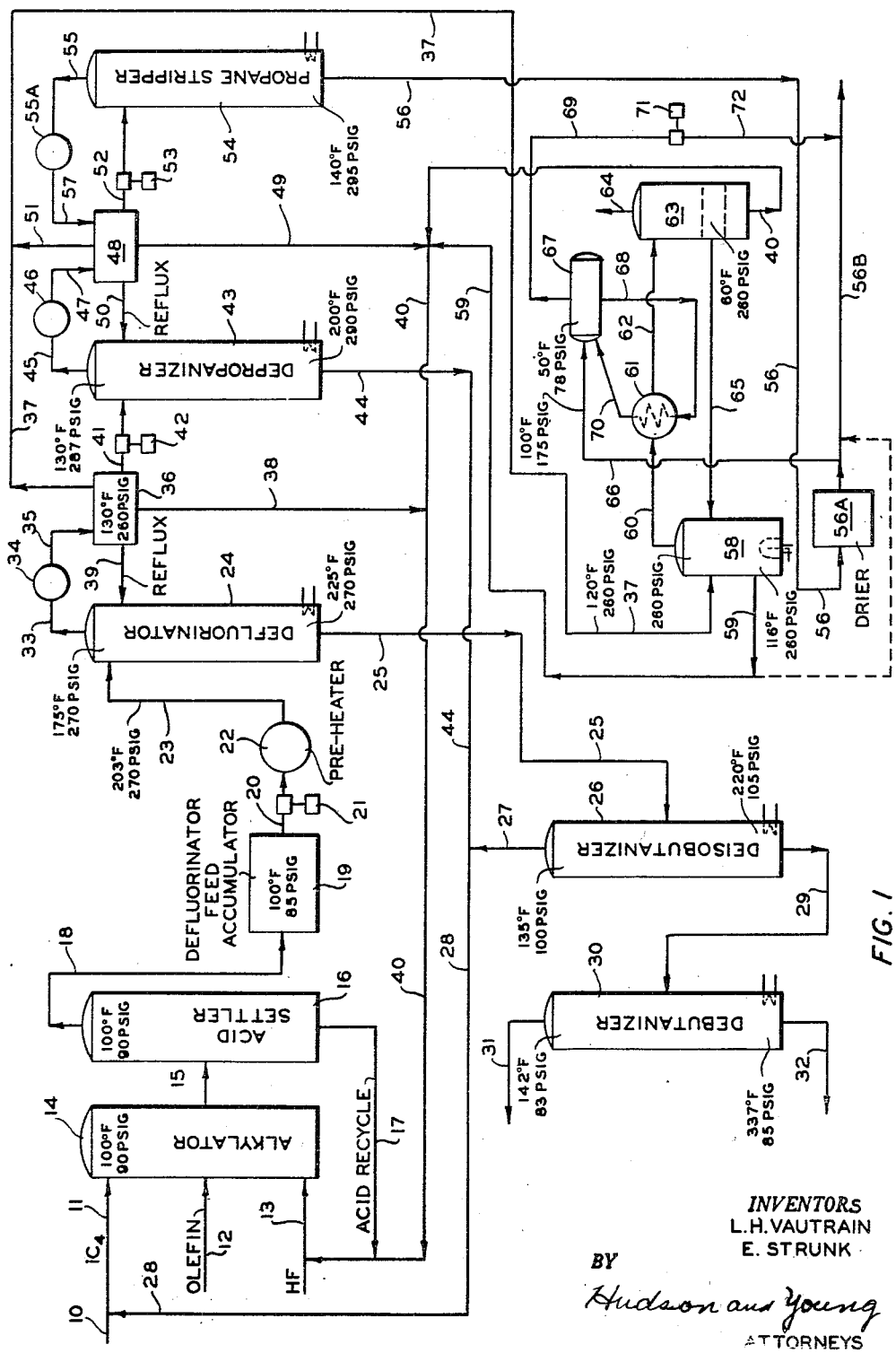

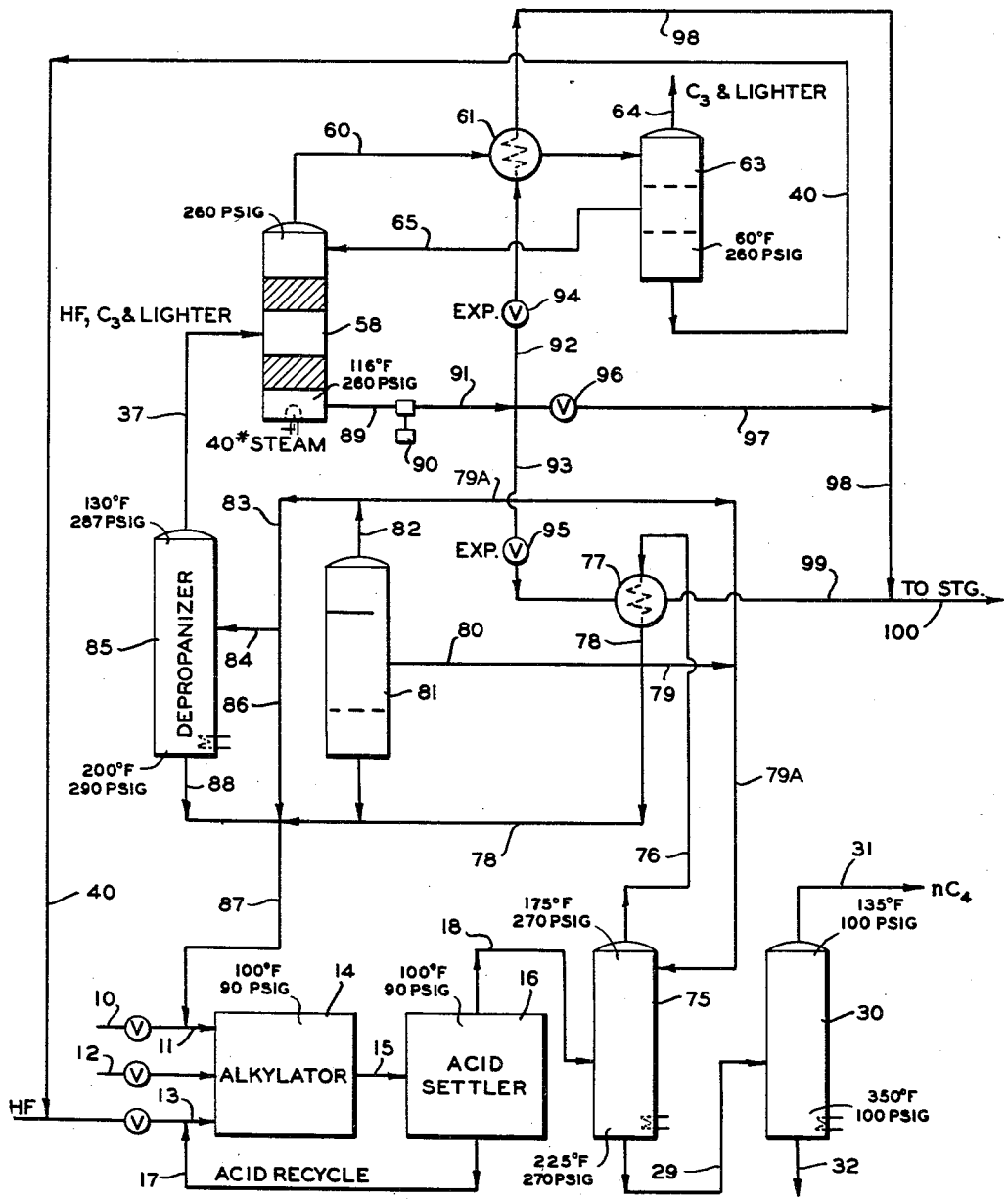
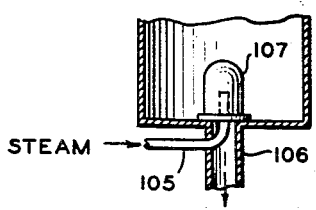
FIG. 2
FIG. 3
INVENTORS
L. H. VAUTRAIN
E. STRUNK
BY
Hudson and Young
ATTORNEYS United States Patent Office 2,773,920
Patented Dec. 11, 1956

2,773,920

RECOVERY OF HYDROGEN FLUORIDE FROM ALKYLATION PRODUCT EFFLUENT

Lucien H. Vautrain and Edward Strunk, Sweeny, Tex.; said Vautrain assignor to Phillips Petroleum Company, a corporation of Delaware Application April 24, 1953, Serial No. 351,018

6 Claims. (Cl. 260—683.4)

This invention relates to the alkylation of an isoparaffin with an olefin in the presence of hydrogen fluoride as a catalyst and to the recovery of hydrogen fluoride from the hydrocarbon effluent from an HF-alkylation of hydrocarbons. In one of its aspects, the invention relates to the recovery of hydrogen fluoride from an HF-alkylation hydrocarbon effluent in an increased proportion over that presently recoverable by methods now extant by providing a combination of treating steps permitting the employ of a novel combination of conditions of temperature, pressure, flow rates, ratios of reflux, etc. The invention provides a method for increasing the recovery of propane and hydrogen fluoride from the alkylation effluent from an HF-alkylation of an isoparaffin with an olefin, for example, an alkylation of isobutane with an olefin.

It is known that the overhead product from the depropanizer overhead accumulator contains hydrogen fluoride, propane, and lighter hydrocarbons. A method for the recovery of the propane and the hydrogen fluoride from the above-described depropanizer overhead accumulator gases is highly desirable.

It has now been found that it is possible to collect and to compress vent gases, obtained during the operation of an alkylation as described, said gases containing propane, gases lighter than propane, and hydrogen fluoride, and to subject said gases to conditions of temperature and pressure under which there is obtained liquid propane from said gases, the said liquid propane being substantially completely free from hydrogen fluoride, and a gaseous phase containing propane, hydrogen fluoride, and gases lighter than propane. Further, by cooling said gaseous phase, there can be obtained therefrom a condensate of hydrocarbon and hydrogen fluoride and a gaseous phase containing substantially only gases lighter than propane. Thus, the gases lighter than propane can be vented from the process and the hydrogen fluoride recovered. The propane which is substantially completely free of hydrogen fluoride is also recoverable, and, as is well known, is a valuable product and can be sold as LPG (liquified petroleum gas).

Thus, according to this invention, there is provided a process for the alkylation of an isoparaffin with an olefin which comprises fractionating a hydrocarbon phase obtained from said alkylation to obtain therefrom a fraction containing gases lighter than propane, some propane, and an equilibrium proportion of hydrogen fluoride, placing said fraction under conditions to obtain liquid propane therefrom, which is removed as a product of the process, and a gaseous phase containing propane, hydrogen fluoride, and gases lighter than propane, cooling said gaseous phase to obtain therefrom a condensate of hydrocarbon and hydrogen fluoride and to form a gaseous phase containing substantially only gases lighter than propane, venting said gases lighter than propane from the process, separating said condensate into a hydrocarbon phase and a hydrogen fluoride phase and recovering said hydrogen fluoride. The hydrocarbon phase which is obtained together with said hydrogen fluoride phase is preferably employed to reflux the operation in which liquid propane substantially completely free of hydrogen fluoride and a gaseous phase containing propane, hydrogen fluoride, and gases lighter than propane are obtained.

In Figure 1 there is diagrammatically illustrated an embodiment according to the invention in which isobutane and an olefin are alkylated in the presence of hydrogen fluoride. In the illustrated embodiment, as will be described below, vent gases are obtained from both a reflux accumulator operated in conjunction with a defluorinator and a reflux accumulator operated in conjunction with a depropanizer. The vent gases are then treated to recover therefrom valuable hydrogen fluoride and propane substantially completely free of hydrogen fluoride and gases lighter than propane which are vented from the process.

In Figure 2, there is shown diagrammatically a flow plan of a process in which isobutane is alkylated with an olefin in the presence of hydrofluoric acid as a catalyst and in which a depropanizer overhead is treated to recover propane substantially completely free of hydrogen fluoride and hydrogen fluoride and gases lighter than propane which are vented from the process.

As an advantageous feature of the invention, illustrated in both Figures 1 and 2, liquid propane obtained in the process is employed to cool the gaseous overhead from the operation in which liquid propane substantially completely free of hydrogen fluoride is obtained, as will be described more fully below.

Referring now to the drawing of Figure 1, isobutane fed by way of conduit 10 and conduit 11, olefin fed by way of conduit 12 and hydrofluoric acid catalyst fed by way of conduit 13 are comingled in alkylator 14, under alkylation conditions, thus obtaining an alkylation effluent containing desired alkylate product. The conditions of temperature, pressure, and time, as well as the ratios of isobutane to olefin and of hydrocarbon to acid are well known in the art. The said conditions do not form a part of the present invention and can be supplied by one skilled in the art. However, the conditions in the alkylator can be as follows: temperature 90–115° F.; pressure 80–175 pounds per square inch gauge; average reaction time, of the order of about 5 to 15 minutes, and rapid agitation to maintain intimate contact between acid and hydrocarbon phases. The ratio of isobutane-to-alkylating agent or olefin will be about 6:1 by weight, acid-to-hydrocarbon ratio will be about 2:1 by weight. The resulting effluent mixture from alkylator 14 is passed by way of conduit 15 to a settler 16 in which it is separated into an acid phase and a hydrocarbon phase. The separated acid is recycled by way of conduit 17 to conduit 13 and thence to alkylator 14, as described. The hydrocarbon phase from acid settler 16 is passed by way of conduit 18 into defluorinator feed accumulator 19. From the accumulator, the hydrocarbon phase is passed by way of conduit 20 equipped with pump 21 into preheater 22 in which it is heated to a temperature and under a pressure suitable for its defluorination. Defluorination is accomplished in defluorinator 24 from the bottom of which is removed a defluorinated alkylation effluent. This defluorinated alkylation effluent contains isobutane and heavier hydrocarbons. It is passed by way of conduit 25 into deisobutanizer 26 in which isobutane is separated therefrom and passed by way of conduit 27 and conduit 28 to conduits 10 and 11 and thence to alkylator 14. From the bottom of the deisobutanizer 26 there is withdrawn through conduit 29 a deisobutanized alkylate which is passed to debutanizer 30 from which there is taken overhead normal butane through conduit 31 and from the bottom of which there is withdrawn through conduit 32 a debutanized alkylate product. This alkylate product can be passed to a rerun and treating zone in which it is rerun and treated under conditions well known to those skilled in the art. Returning now to defluorinator 24, there is taken overhead therefrom through conduit 33 and cooler condenser 34 a stream containing isobutane, hydrogen fluoride, propane, and gases lighter than propane. From condenser 34, the stream passes through conduit 35 into reflux accumulator 36 in which there separates vent gases removed through conduit 37, acid removed through conduit 38, and a hydrocarbon phase removed and returned as reflux to the defluorinator through conduit 39. The acid withdrawn through conduit 38 is recycled through conduit 40 through conduit 13 and thence to alkylator 14. Production quantities of hydrocarbon phase accumulating in vessel 36 are passed by way of conduit 41 and pump 42 into depropanizer 43. Isobutane is removed from the hydrocarbon stream in the depropanizer and withdrawn therefrom through conduit 28 and conduit 44 and recycled by way of conduit 28 and conduit 10 to conduit 11 and thence to alkylator 14. The overhead from the depropanizer passes by way of conduit 45, cooler condenser 46, and conduit 47 into accumulator vessel 48 in which phase separation occurs. A portion of the material accumulating in vessel 48 consists of acid which is withdrawn therefrom through conduit 49 and recycled by way of conduit 40 and conduit 13 to alkylator 14. Another portion of the material consists of hydrocarbons, at least a portion of which can be passed through conduit 50 into depropanizer 43 as reflux therefor. Gases containing some propane, hydrogen fluoride, and gases lighter than propane are taken overhead from vessel 48 by way of conduit 51 and passed into conduit 37. Production quantities of the hydrocarbon phase accumulating in vessel 48 are passed by way of conduit 52 and pump 53 into propane stripper 54 wherein the propane is stripped of materials lighter than propane. Overhead is passed through conduit 55, cooler condenser 55A, and conduit 57 into vessel 48. Propane which is substantially completely free of hydrogen fluoride is withdrawn from propane stripper 54 by way of conduit 56 is passed through a drier 56A, and can be passed to caustic treatment and then to storage or used as hereafter described. The vent gases in conduit 37 are passed to vent gas fractionator 58 in which conditions of temperature and pressure are such that propane substantially completely free of hydrogen fluoride forms as a liquid phase and is withdrawn through conduit 59 to conduit 40 or if desired to conduit 56B and thence to storage or employed as hereafter described.

The pressure in the vent gas fractionator 58 can be varied as will be understood by those skilled in the art. However, it is now preferred to maintain the pressure in said fractionator within the range of from about 100 to about 450 pounds per square inch absolute. Further, as will be understood by one skilled in the art, the temperature will depend upon the pressure at which the vent gas fractionator or absorber is operated as well as upon the composition of the feed. The temperature of the vent gas fractionator overhead, which is rich in hydrogen fluoride, can range from about minus 30 to 65° F. depending upon the pressure selected for operation of the system. The overhead from fractionator 58 passes by way of conduit 60 and cooler condenser 61 through conduit 62 into separator 63. In separator 63 there are formed a gaseous phase containing hydrocarbons and gases lighter than propane, which may be present in the process, liquid propane, and liquid hydrogen fluoride. The gases are vented from the process by way of conduit 64, the liquid propane is employed as reflux and is returned to fractionator 58 by way of conduit 65 while hydrogen fluoride is withdrawn from separator 63 and recycled by way of conduit 40 and conduit 13 to alkylator 14.

The temperature and pressure in separator or reflux accumulator 63 will be substantially that of the column and, as noted, the uncondensed overhead product therefrom, which is rich in methane, is vented from the process. The internal construction of absorber or fractionator 58 is such that intimate liquid to gas or vapor contact is assured.

As a feature of the invention, as stated, propane obtained within the process is employed under conditions to effect the cooling in cooler condenser 61. Thus, propane is taken from conduit 56B by way of conduit 66 to expansion chamber 67, in which the propane is cooled by evaporation of a portion thereof, and thence through conduit 68 through one side of cooler condenser 61 from which the propane passes through conduit 70 back to expansion chamber 67. Propane vapors leave chamber 67 by way of conduit 69 and are compressed by pump 71 and pumped into conduits 72 and 56B from which they can be employed by way of conduit 66 or passed to storage.

For simplicity's sake, conditions which can be employed at each of the several important places within the the described embodiment have been indicated on the drawing. It will be obvious that the invention is not limited to the specific conditions there illustrated. However, it will be noted that a combination of the said conditions results in the advantageous results which are obtained according to the invention which provides a combination of steps making the employ of the said conditions possible.

It is also to be noted that the propane in conduit 66, in an alternative operation, not shown in the drawing, can be divided into two portions and one portion employed to cool another which can then be directly injected into the overhead leaving fractionator 58 by way of conduit 60, thus to obtain the liquefaction desired for the separation to be accomplished in separator 63.

Referring now to Figure 2, in which elements identical in function with elements in Figure 1 are given the same numbers, the hydrocarbon phase is taken from separator 16 by way of conduit 18 and passed into fractionator 75. From the bottom of fractionator 75 a deisobutanized alkylate product is removed by way of conduit 29 to debutanizer 30. In debutanizer 30 normal butane is separated from the alkylate product and taken overhead by way of conduit 31 and alkylate product is withdrawn through conduit 32 to storage or to other treatment as well known in the art. Overhead from fractionator 75 containing propane, gases lighter than propane, and hydrogen fluoride is passed through conduit 76 and cooler condenser 77 into conduit 78. A portion of the condensed overhead is passed by way of conduit 79 and 79A to the top of fractionator 75 as reflux. Production quantities of condensed overhead are passed by way of conduit 80 into separator 81. In separator 81, phase separation takes place and a hydrocarbon phase containing propane, gases lighter than propane, and some isobutane is taken off into conduit 82 by way of which a portion can be recycled to conduit 79A and fractionator 75 as reflux. Production quantities of this hydrocarbon phase are passed by way of conduit 83 and conduit 84 into depropanizer 85. If desired, some of the hydrocarbon in conduit 83 can be passed into conduit 86 and thence by way of conduit 87 to conduit 11 and thence into alkylator 14. In depropanizer 85, final portions of isobutane are recovered as bottoms and withdrawn through conduit 88 and passed by way of conduits 87, and 11 into alkylator 14. The depropanizer overhead contains propane, hydrogen fluoride, and gases lighter than propane. This overhead passes by way of conduit 37 into vent gas fractionator 58, the operation of which has been described in connection with Figure 1. The overhead from fractionator 58, as described in connection with Figure 1, is passed through conduit 60 and cooler condenser 61 into separator 63. The operation of separator 63 is described in connection with Figure 1. The operation described in Figure 2 is not only different from that described in Figure 1 in respect of the treatment of the alkylation effluent but is also different in respect of the flow of the propane which is withdrawn from the bottom of the vent gas fractionator 58. Thus, in Figure 2, the propane is withdrawn from the bottom of the fractionator 58 by way of conduit 89 and pump 90 and passed by way of conduit 91 to conduit 92 and to conduit 93. Both conduits 92 and 93 are equipped with pressure reducing valves 94 and 95, respectively. Liquid propane is allowed to expand through cooler condensers 61 and 77 respectively thus providing within the embodiment the cooling required for the operation of the process set forth. Production quantities of propane pass through valve 96 on conduit 97 into conduit 98 to which conduit is passed the propane which has served as coolant in condenser 61 leaving the said condenser by way of conduit 98. Propane which has served as coolant in cooler condenser 77 leaves the same by way of conduit 99. Finally, the propane in conduit 98 and 99 are combined and passed to storage by way of conduit 100.

As given in connection with Figure 1 there are given on Figure 2 conditions which are illustrative of those which can be employed in such a combination by virtue of the invention.

It is obvious that the operation exemplified in Figure 2 is not limited to the specific conditions there recited.

In Figure 3 is shown the detail of the reboiler which is advantageously employed in the bottom of vent gas fractionator 58. The construction of the reboiler is particularly adapted to advantageously reboil the bottoms of vent gas fractionator 58. Steam is passed by way of conduit 105 into and through conduit 106 from which it emerges into the space defined by shell 107 which is in sealed engagement with the bottom of said fractionator. Condensate collects at the bottom of the space defined by shell 107 and drains through conduit 106, which is in sealed engagement with the bottom of said fractionator, to sewer. It will be noticed that the design of the reboiler shell is extremely simple. Thus, especially during times of shut-down, the corrosion problem in the presence of acid is considerably minimized over what it would be with the usual tube-bundle type of condenser.

In an actual operation of the invention a vent gas, heretofore either released to the atmosphere or otherwise treated and containing 12.6 pounds of HF per hundred pounds of vent gas, yielded up 76% of its contained HF, i. e. 9.57 pounds of HF which was recovered and reused. Also, an additional 32.5% of the hydrocarbon principally propane was recovered.

From the foregoing data it is obvious that treating the vent gases which heretofore have been discarded or chemically treated prior to discard has resulted in a considerable savings of hydrogen fluoride and propane. Still further, it is obvious that the use of the propane as it is recovered in situ in the process is possessed of certain advantages providing heretofore unattainable energy requirement savings.

Reasonable variation and modification are possible within the scope of the foregoing disclosure, drawing, and the claims to the appended invention, the essence of which is that vent gases containing propane, hydrogen fluoride, and gases lighter than propane are treated to recover therefrom propane substantially completely free of hydrogen fluoride and hydrogen fluoride, leaving only undesired portions of the vent gases to be discarded. Also, a novel reboiler apparatus, which is employed in the vent gas fractionator which has been described, has been set forth. Still further, apparatus combination with which to effect the method of the invention has been set forth.

We claim:

1. In the alkylation of an isoparaffin with an olefin in the presence of hydrofluoric acid as a catalyst in which there is obtained an alkylation effluent containing desired alkalate product, gases lighter than propane, propane, isobutane, normal butane, and hydrofluoric acid, the steps in combination comprising: fractionating a hydrocarbon phase obtained from said alkylation to obtain therefrom a fraction containing gases lighter than propane, some propane, and an equilibrium proportion of hydrogen fluoride; placing said fraction under conditions to obtain liquid propane therefrom, which is removed as a product of the process, and a first gaseous phase containing propane, hydrogen fluoride, and gases lighter than propane; cooling said first gaseous phase to obtain therefrom a condensate of hydrocarbon and hydrogen fluoride and to form a second gaseous phase containing substantially only gases lighter than propane, venting said second gaseous phase from the process; separating said condensate into a hydrocarbon phase and a hydrogen fluoride phase and recovering said hydrogen fluoride.

2. In the alkylation of isobutane with an olefin in the presence of hydrofluoric acid catalyst in which there is obtained an alkylation effluent containing desired alkylate product, gases lighter than propane, propane, isobutane, normal butane, and hydrofluoric acid, the steps in combination comprising: forming a hydrocarbon phase and an acid phase; separating said acid phase from said hydrocarbon phase; defluorinating said hydrocarbon phase; fractionating said hydrocarbon phase to obtain therefrom a fraction containing gases lighter than propane, some propane, and an equilibrium proportion of hydrogen fluoride; placing said fraction under conditions to obtain liquid propane therefrom which is removed as a product of the process, and a first gaseous phase containing propane, hydrogen fluoride, and gases lighter than propane; cooling said first gaseous phase to obtain therefrom a condensate of hydrocarbon and hydrogen fluoride and to form a second gaseous phase containing substantially only gases lighter than propane; venting said second gaseous phase from the process; separating said condensate into a hydrocarbon phase and a hydrogen fluoride phase; recovering said hydrogen fluoride phase and refluxing said first-mentioned gaseous phase with said hydrocarbon phase.

3. A process according to claim 2 wherein at least a portion of said liquid propane is vaporized to yield a coolant and wherein said coolant is employed by heat exchange to effect said cooling.

4. In an alkylation process in which hydrofluoric acid is employed as a catalyst and there is obtained a vent gas containing propane, gases lighter than propane, and equilibrium proportions of hydrogen fluoride, the steps comprising: compressing said vent gas at a temperature at which liquid propane substantially completely free from hydrogen fluoride can be separated therefrom, thus forming liquid propane substantially completely free from hydrogen fluoride and a gaseous phase containing said gases lighter than propane, some propane, and hydrogen fluoride; cooling said gaseous phase to condense to liquid virtually all the hydrogen fluoride and at least a portion of said gases lighter than propane and some propane, thus forming a liquid hydrocarbon phase and a liquid hydrogen fluoride phase; and recovering said liquid propane substantially completely free from hydrogen fluoride and said hydrogen fluoride as products of the process.

5. An apparatus for the recovery of hydrogen fluoride and propane from an alkylation process vent gas which comprises in combination a fractionator; a conduit for feeding said vent gas to said fractionator in communication with an intermediate section of said fractionator; heating means in a lower portion of said fractionator; a heat exchange means; a second conduit in communication with an upper portion of said fractionator and one side of said heat exchange means; a gas separator; a third conduit in communication with said one side of said heat exchange means and said gas separator; a fourth conduit in communication with an intermediate portion of said gas separator and an upper section of said fractionator; a liquid draw off conduit in communication with the bottom of said gas separator; a gas removal conduit in communication with the top of said gas separator; an expansion chamber; a fifth conduit in communication with the other side of said heat exchanger and said expansion chamber, to feed coolant to said heat exchanger; a sixth conduit also in communication with said other side of said heat exchanger and said expansion chamber to remove used coolant from said heat exchanger; and a seventh conduit in communication with said expansion chamber to feed a vaporizable coolant thereto.

6. An apparatus according to claim 5 wherein in the bottom of said fractionator there is provided an inverted shell in sealed engagement with the bottom of said fractionator; an inlet pipe terminating within the space within said shell, adapted to discharge a heat transfer medium into said shell; and an outlet pipe in sealed engagement with the bottom of said fractionator and in communication with the bottom of said space to remove said heat transfer medium from said space.

References Cited in the file of this patent

UNITED STATES PATENTS

| | | |
|---|---|---|
| 1,466,535 | Kyrides | Aug. 28, 1923 |
| 1,511,056 | Ercanbrack | Oct. 7, 1924 |
| 1,513,449 | Ericksen | Oct. 28, 1924 |
| 1,844,776 | McElroy | Feb. 9, 1932 |
| 1,967,706 | Carroll | July 24, 1934 |
| 2,404,483 | Frey | July 23, 1946 |
| 2,425,745 | Leonard et al. | Aug. 19, 1947 |
| 2,444,316 | Vautrain | June 29, 1948 |
| 2,549,609 | Johnson | Apr. 17, 1951 |
| 2,573,807 | Piros et al. | Nov. 6, 1951 |
| 2,612,464 | Giachetto et al. | Sept. 30, 1952 |